United States Patent Office 3,523,888
Patented Aug. 11, 1970

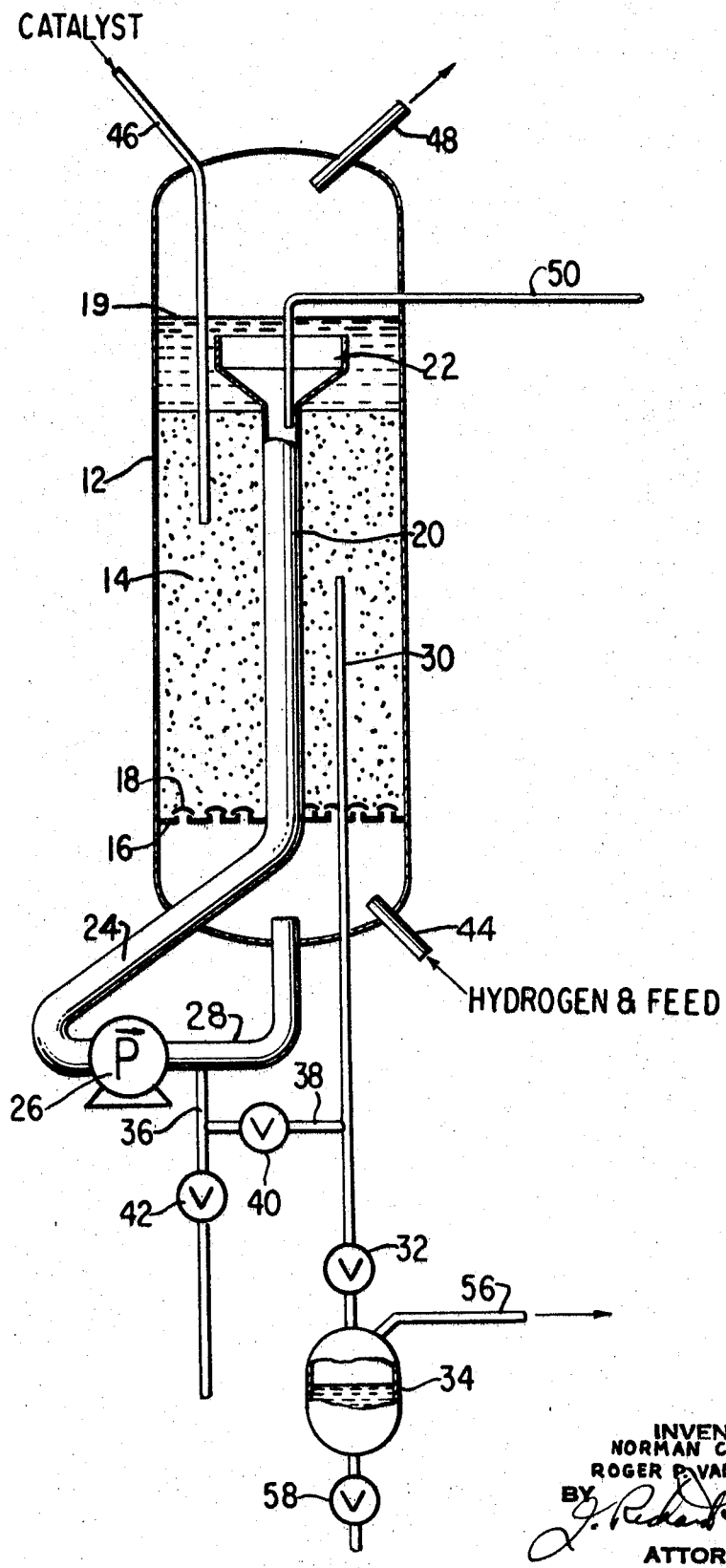

3,523,888
CATALYST WITHDRAWAL PROCESS
Norman C. Stewart, Kendall Park, and Roger P. Van Driesen, Hopewell, N.J., assignors to Cities Service Research and Development Company, New York, N.Y., a corporation of Delaware
Filed Dec. 26, 1967, Ser. No. 693,615
Int. Cl. C10g 23/06
U.S. Cl. 208—157
6 Claims

ABSTRACT OF THE DISCLOSURE

A method for the controlled withdrawal of particulate catalyst from an operating high pressure ebullated bed hydrogenation reactor is disclosed herein. The hydrogenation reactor has an internal liquid recycle conduit with a pump attached to the bottom end of the conduit, which pumps recycled liquid through a return conduit back into the bottom of the reactor. A catalyst withdrawal conduit extends into the catalyst bed of the reactor and is connected to the return conduit by suitable valves and a connecting conduit. In the present improved method, catalyst particles are intermittently withdrawn from the operating hydrogenation reactor by withdrawing a catalyst particle and liquid mixture at reactor pressure from the catalyst bed through the catalyst withdrawal conduit to a catalyst discharge pot at the other end of the withdrawal conduit until the desired amount of particulate catalyst is removed from the reactor, whereupon withdrawal of particulate catalyst is terminated. Fluid flow in the withdrawal conduit is then reversed by pumping a portion of the recycled liquid from the recycle pump through the connecting conduit to the lower end of the withdrawal conduit thereby purging the withdrawal conduit of catalyst particles and preventing in situ coking and clogging of the conduit.

BACKGROUND OF THE INVENTION

This application relates to an improved semi-continuous catalyst withdrawal method for use in high pressure operating catalytic reactors.

The invention has particular application to apparatus of the type where fluid is passed upwardly through a catalyst bed while the bed is maintained in an expanded, agitated or ebullated state. Apparatus and processes characteristics of this type of catalytic treatment are exemplified by the Hydrogenation of Liquid Hydrocarbon Oils described in U.S. Pat. No. 2,967,465 and U.S. Pat. No. Re. 25,770 issued to Johanson.

It is general practice to remove spent, deactivated particulate catalyst from such ebullated bed hydrogenation reactors intermittently by means of a valved conduit extending substantially vertically downward from the catalyst bed through the bottom of the hydrogenation vessel. The main drawback of this method has been the tendency of the catalyst withdrawal conduit to plug up with coke formed by in situ cracking of the hydrocarbon oil within the conduit. Purging the conduit when not in use with hydrogen to clear it of coke is not entirely practical, since such a practice requires large amounts of cool hydrogen. Besides being uneconomical as a purging medium, the hydrogen is inefficient from the process viewpoint, as excessive amounts of the gas interfere with the hydrogenation treatment by building up in unfavorable and undesirable locations within the reaction zone. Finally, this type of catalyst withdrawal method requires careful attention and excessive maintenance in order to repeatedly withdraw catalyst without clogging the withdrawal conduit.

SUMMARY OF THE INVENTION

Briefly our invention is an improved method for intermittently withdrawing particulate catalyst from an operating high pressure catalytic reactor having a recycle conduit. The method comprises intermittently withdrawing a particulate catalyst and fluid mixture at reactor pressure through a catalyst withdrawal conduit from the reactor, terminating the particulate catalyst and fluid mixture withdrawal, and reversing the flow in the catalyst withdrawal conduit, by passing liquid from the recycle conduit into the lower end of the catalyst withdrawal conduit, until withdrawal of particulate catalyst is resumed.

It is therefore an object of this invention to provide an improved method for withdrawing catalyst from an operating pressurized reactor.

Another object of this invention is to provide a method for withdrawing particulate catalyst from an ebullated bed type reactor without plugging the withdrawal conduit.

Other objects and advantages of the improved method of this invention will be apparent from the description and drawings of the preferred embodiments which follow.

BRIEF DESCRIPTION OF THE DRAWINGS

The drawing is a cut-away elevation of a hydrogenation reactor with associated catalyst withdrawal apparatus for operation of the particulate catalyst withdrwal method according to this invention.

DESCRIPTION OF THE PREFERRED EMBODIMENTS

The drawing shows a reactor vessel 12 capable of withstanding operating pressures on the order of 1,000 to 5,000 p.s.i.g., and temperatures above 400° F., which are normally associated with the treatment of petroleum fluids by contacting the fluids with hydrogen in the presence of hydrogenation catalyst. The hydrogenation catalyst is retained in a catalyst bed 14 as a mass of particulate catalyst. Particulate catalysts are well-known in the art, those suitable for use as hydrogenation at catalyst being composed of various metals, their oxides and sulfides as for instance cobalt, iron, molybdenum, nickel, tungsten, and mixtures thereof. Such catalysts may be used either alone or in combination with other suitable catalysts e.g. natural occurring clays, and also may be supported on various carriers or bases, these being principally alumina, silica, or silica-alumina. Additionally newer synthetic catalyst particles may also be employed, such as molecular sieves. Generally speaking, the catalyst particles employed are those described as macrospheres, rather than the smaller microspheres which are commonly employed in fluid bed type catalytic reactors. These macrosphere particles are larger than 300 angstrom units, with those particles having a diameter ranging from about $\frac{1}{64}$ of an inch to about $\frac{1}{2}$ inch, and shaped in the form of elongated extrudates being particularly preferred. The catalyst bed 14 is supported on a conventional bubble cap tray 16, the tray being mounted transversely in the lower portion of the reactor vessel 12 and having a multiplicity of bubble caps 18 which allow fluid to flow upwards from the bottom of the vessel 12 while retaining the particulate catalyst in the bed 14. In operating the hydrogenation process, the catalyst bed 14 is preferably in the form of an expanded or ebullated bed. The ebullated bed is maintained by passing liquid or a mixture of liquid and gases upwardly through the mass of catalyst particles at a sufficient velocity to expand the volume of the catalyst bed 14 and cause random movement of catalyst particles within the bed 14. However, the upward velocity is in sufficient to cause the catalyst particles to carry over from the bed 14. In general the expansion of the catalyst bed 14 in such instances is normally between about 10% and about 300% based on the unexpanded volume of the mass of catalyst particles. A liquid level 19 defining the upper level of the mass of fluid reactants primarily in the liquid phase extends above the catalyst bed 14.

A recycle conduit 20 is fixedly mounted in a vertical position within the reactor vessel 12. The top of the recycle conduit 20 extends outwardly as a funnel shaped downcomer head 22, the top of which is located above the catalyst bed 14. The downcomer head 22 aids in gas-liquid separation since the sides of the funnel shaped downcomer head 22 direct the upward flow of the reactant fluids away from the mouth of the head and thereby more readily allow the lighter components of the reactatnt fluids to bypass the head and separate from the denser liquid portion at the surface of the reactant liquid level 19. The lower portion 24 of the recycle and conduit 20 passes through the bottom of the reactor vessel 12 and feeds recycled liquid into the inlet of a pump 26, which in turn pumps the recycled liquid through a return conduit 28 back into the bottom of the reactor vessel 12.

While the pump 26 is shown as the preferred means for producing a pressure differential and flow within the recycle conduit, is should be understood that the pump 26 is not the only means for producing such a flow. The recycle liquid reactant flow may be self-sustaining, being the result of gas-liquid disengagement aided by the downcomer head 22 and downward flow of the separated denser liquid through the recycle conduit and back into the reactor vessel bottom. The pressure differential which is required for satisfactory flow is rather low, being on the order of about 5 p.s.i.

A vertical catalyst withdrawal conduit 30 passes through the bottom of the reactor vessel 12 and through the bubble cap tray 16 into the lower portion of the catalyst bed 14. The lower end of the catalyst withdrawal conduit 30 connects through a catalyst withdrawal valve 32 with a catalyst withdrawal pot 34. A series of pipes and valves connect the catalyst withdrawal conduit with the recycle liquid return conduit 28 in order to provide for controlled flow from the return conduit to the catalyst withdrawal conduit 30. Communicating with the return conduit 28 is a recycle liquid withdrawal conduit 36 which is attached to the bottom of the catalyst withdrawal conduit 30 through connecting conduit 38 and connecting conduit valve 40. Fluid withdrawal valve 42 in conduit 36 provides a means for controlling the withdrawal of recycled fluid from the recycle conduit 20 as determined by process requirements.

Fresh feedstock mixed with hydrogen is supplied to the reactor through feed pipe 44 and together with the recycled liquid passes upwardly through the bubble cap tray 16 into the bed of the reactor. The feed may be any suitable hydrocarbon oil, preferably one boiling in the range betwteen 350° F. and 1100° F., and may include e.g. virgin or thermal naphtha, catalytic cracking naphthas, cycle oil, virgin or thermal gas oils, coker distillate, vacuum gas oils, deasphalted gas oils, and any other fractions derived from crude oil or from naturally occurring sources or from synthetic crudes produced from natural tar, shale oil, tar sand or coal. Relatively heavy hydrocarbon oils boiling above 650° F. are especially suitable for treating witht hydrogen in an ebullated bed type reaction vessel. Fresh or regenerated catalyst is passed into the catalyst bed 14 through catalyst feed conduit 46 whenever required in order to maintain the catalyst bed 14 at the desired level. Hydrogenation product streams are withdrawn from the hydrogenation reactor vessel 12 as a low boiling gaseous effluent stream through effluent conduit 48 and a high boiling liquid hydrocarbon stream through both a liquid drawoff conduit 50 extending into the recycle conduit 20, and the recycle liquid withdrawal conduit 36.

In operation, particulate catalyst is withdrawn from the reactor vessel 12 by opening valve 32, thereby allowing a mixture of catalyst particles and fluid to flow down the catalyst withdrawal conduit 30 into the catalyst withdrawal pot 34, which is at a low pressure differential with the vessel 12 (e.g. 50 to 200 p.s.i.). The fluid and particulate catalyst are separated by venting the fluid from the catalyst withdrawal pot 34 through vent line 56 for further treatment along with gaseous effluent and withdrawn liquid product from the reactor vessel 12. The withdrawal of the catalyst and fluid mixture is terminated by closing valve 32 whereupon accumulated catalyst particles in the pot 34 can be dumped by opening a dumping valve 58. Spent catalyst particles thereafter can be either regenerated and returned to the reactor vessel 12 or discarded as a particular treatment may require.

After the catalyst withdrawal valve 32 has been closed, the catalyst withdrawal conduit 30 is purged by opening valve 40 at which time valve 42 may be closed, thereby causing a portion of the recycle liquid to flow through the connecting conduit 38 and up the catalyst withdrawal conduit 30 back into the reactor vessel 12. The upward flow of the high pressure recycle liquid in the withdrawal catalyst conduit 30 carries any contained particulate catalyst out of the withdrawal conduit and back into the catalyst bed 14. Recycled liquid flow in the catalyst withdrawal conduit 30 is maintained until the withdrawal of the particulate catalyst and fluid mixture is resumed at which time the process according to this invention is repeated. The removal of catalyst particles from the catalyst withdrawal conduit by the upward liquid flow in the conduit substantially retards any in situ coking with coincident plugging of the withdrawal conduit and reduces the need to repeatedly shutdown the operation in order to maintain the catalyst withdrawal conduit in operating condition. An important advantage inherent in this catalyst withdrawal process is that no additional fluids, such as hydrogen or inert gases, need be introduced into the reactor vessel 12. Having described the process of this invention, the following example is given by way of illustration and not of limitation.

EXAMPLE I

Utilizing an apparatus arranged as shown in the drawings, a heavy residual petroleum oil fraction mixed with 7200 s.c.f. of hydrogen per barrel of oil, is introduced into the hydrogenation reactor vessel 12 which is operated at a temperature of about 825° F., and a pressure of about 2500 p.s.i.g. The catalyst bed 14 is maintained in an ebullated state by passing the oil-gas mixture through the bed with an upflow velocity of about 49 gals. per min. per sq. ft. of horizontal cross sectional flow area.

The amount of catalyst contained in the bed 14, specifically the catalyst inventory in the reactor vessel 12 is about 48,000 lbs. of 0.025 to 0.035 inch diameter cobalt-molybdate extrudates, 60% weight of which have from about 0.1 to 0.25 inch, less than 10% of which have a length of greater than 0.25 inch and less than 30% of which have a length below 0.1 inch.

About 1100 lbs. of spent catalyst is withdrawn from the reaction vessel 12 by opening valve 32 and closing valve 58, the low pressure differential of about 150 p.s.i. between the reactor vessel pressure and the pressure existing in the catalyst withdrawal pot 34, causing a flow of particulate catalyst and reactant fluid through the withdrawal conduit 30 into the pot where the fluid portion of the mixture is vented out to vent pipe 56. After about 1100 pounds of partictulate catalyst particles are accumulated in the withdrawal pot 34, valve 32 is closed and valve 40 opened. A portion of the recycled liquid stream passes through connecting pipe 38 and up the catalyst withdrawal conduit 30 at a pressure 5 p.s.i. above reactor pressure in order to provide for a sufficiently high flow rate to remove catalyst particles trapped within the withdrawal conduit 30.

While the invention has been described above in connection with specific embodiments, it will be understood by those skilled in the art to cover those changes and modifications which may be made without departing from the spirit and scope of the invention.

We claim:
1. A method for controlled withdrawal of particulate catalyst from an operating high pressure high temperature vessel in which a heavy hydrocarbon oil boiling in the range above 650° F. is treated with hydrogen in the presence of an ebullated bed of particulate catalyst, said vessel having a liquid reactant recycle conduit, with a portion of the recycle conduit external to the vessel, a pump in said external portion of the recycle conduit and a catalyst withdrawal conduit, said method comprising:
   treating said heavy hydrocarbon oil with a hydrogen containing gas by passing the hydrogen gas and heavy oil upwardly through said ebullated catalyst bed in the vessel at temperatures above about 800° F. and pressures above 1000 p.s.i.;
   separating treated liquid hydrocarbon oil reactant from gaseous effluents above said ebullated catalyst bed;
   continually passing said treated liquid reactant down through said recycle conduit and through said pump and back into the bottom of said vessel
   periodically withdrawing a particulate catalyst and fluid mixture from the vessel through the catalyst withdrawal conduit;
   terminating said withdrawal of catalyst and fluid mixture; and then
   pumping a portion of said liquid reactant from the external portion of said recycle conduit up through the catalyst withdrawal conduit and back into the vessel, said liquid recycle reactant containing unconverted heavy hydrocarbon oil and being substantially liquid at temperatures above 650° F. and pressure above 1000 p.s.i.g.

2. The method of claim 1 wherein the step of passing liquid reactant from the recycle conduit through the catalyst withdrawal conduit comprises pumping a portion of the liquid reactant from the recycle conduit through a connecting conduit into the catalyst withdrawal conduit.

3. The method of claim 2 wherein the particulate catalyst and fluid mixture is intermittently withdrawn from the vessel to a particulate catalyst; and fluid separation zone maintained at a low pressure differential with the vessel.

4. The method of claim 2 wherein the reactant liquid is continually pumped into the catalyst withdrawal conduit until the withdrawal of particulate catalyst is resumed.

5. The method of claim 4 wherein said method includes continuously passing a hydrocarbon oil feed mixed with hydrogen upwardly in the high pressure vessel, continuously recycling a portion of the liquid reactant via the recycle conduit from the upper portion of the vessel to the bottom of the vessel and passing said recycled liquid reactant upwardly in the high pressure vessel together with said oil feed and hydrogen.

6. The method of claim 5 wherein said oil feed, said hydrogen and said recycled liquid reactant are passed upwardly at a velocity sufficient to maintain an ebullated bed of said particulate catalyst in said vessel.

References Cited
UNITED STATES PATENTS

| | | | |
|---|---|---|---|
| 3,227,528 | 1/1966 | Jaeger | 208—143 |
| 3,336,217 | 8/1967 | Meaux | 208—143 |

HERBERT LEVINE, Primary Examiner

U.S. Cl. X.R.

208—143; 23—288, 289